R. SATO & K. IWATA
INVENTORS

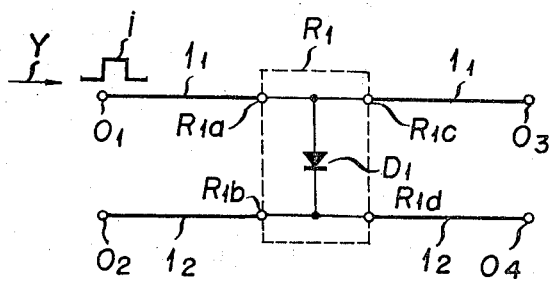
FIG. 1
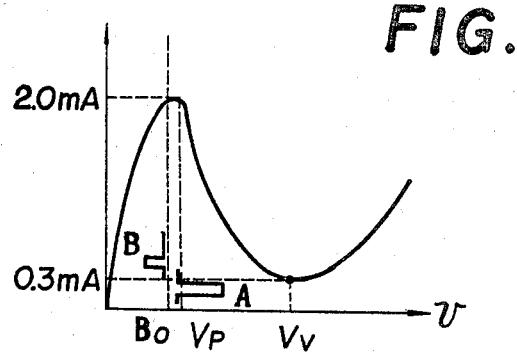
FIG. 2
FIG. 3    FIG. 4
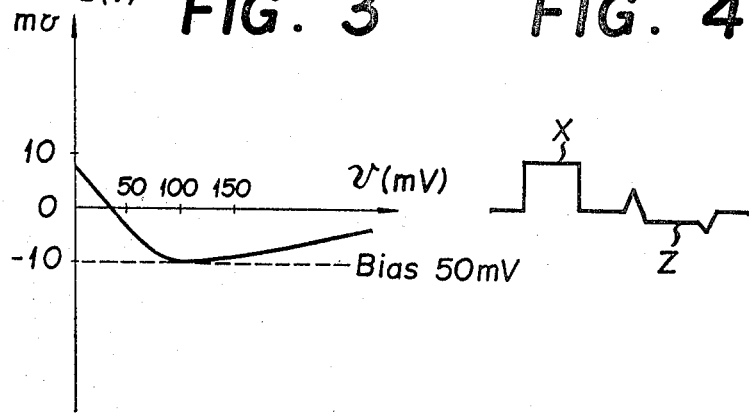
R. SATO & K. IWATA
INVENTORS

United States Patent Office 3,443,030
Patented May 6, 1969

3,443,030
PULSE TRANSMISSION CABLES
Risaburo Sato and Kansei Iwata, Sendai-shi, Japan, assignors to Nippon Telegraph and Telephone Public Corporation, Tokyo, Japan, a corporation of Japan
Filed May 10, 1965, Ser. No. 454,533
Claims priority, application Japan, May 13, 1964, 39/28,701, 39/28,702; May 30, 1964, 39/30,410
Int. Cl. H04l 25/66
U.S. Cl. 178—70                    4 Claims

ABSTRACT OF THE DISCLOSURE

A pulse transmission cable including a plurality of repeaters, each including a tunnel diode as its principal element, shunted across the cable at spaced points therealong. The diodes are biased outside the region of negative resistance so that the diodes function as resistors in response to pulses of amplitude below a predetermined value and function as amplifiers in response to pulses of amplitude exceeding said predetermined value.

---

This invention relates to a pulse transmission cable, and more particularly to a pulse transmission cable wherein repeaters essentially consisting of a tunnel diode are included in the cable at predetermined spaced points so as to transmit pulse signals without any appreciable loss.

As is well known to those skilled in the art, when it is desired to transmit electrical signals over a long distance through a signal transmission cable there are such problems that the signals being transmitted undergo attenuation and wave distortion owing to the distributed circuit constants along the length of the cable, noise, crosstalk and the like, thus making it difficult to provide effective transmission of the signal. In order to compensate the above mentioned attenuation, wave distortion and the like problems encountered in transmitting signals over a long distance it has been the practice to provide suitable repeaters at predetermined spaced points along the signal transmission cable. Conventional repeaters can be conveniently classified into two types, viz. the collective type and the unit type. In the collective type, repeaters are situated at a predetermined spacing along the length of the signal transmission cable by taking into consideration the overall conditions from the source to the load. More particularly, each of the repeaters is respectively designed to satisfy the overall conditions from the source to the load so that the output wave forms from the repeaters at various stages are not the same. Among the collective type repeaters may be mentioned a bidirectional negative impedance repeater utilizing a sine wave signal source. However, these negative impedance repeaters are not sufficiently stable to provide effective signal transmission when they are interposed at a predetermined spacing. It has also been known to use a bidirectional Neuristor line utilizing a source of pulse signals but this line is yet in the developmental stage so that a long Neuristor line is not commercially available.

In the unit type a sine wave is utilized as the signal source and the unidirectional repeater includes a negative feedback amplifier, a pulse repeater or the like. Also included in this type is a pulse repeater as disclosed in the Japanese patent publication No. 680 of 1964 to Western Electric Company, U.S.A. Briefly stated, this last mentioned system comprises a signal transmission cable, a source of pulse signal connected to one end of the cable, a load connected to the opposite end of the cable, and a plurality or repeaters included in the cable at predetermined points thereof, each of said repeaters comprising a negative resistance diode as its essential element and being constructed as a four terminal network. This repeater is characterized in that pulse signals supplied thereto from the source through the signal transmission cable are transferred to the succeeding cable section by the switching action of the negative resistance diode contained in the repeater, and the operation of such a repeater is based on the assumption that the wave shapes of the outputs from respective repeater stages are the same.

The repeater according to this invention is of the collective type and is different from the pulse repeater disclosed in the above mentioned Japanese patent publication in that the wave forms of the outputs from the successive repeater stages are not required to be the same and that the repeater utilized in this invention includes a two terminal network. Moreover the repeater of this invention is different from known negative feed back amplifiers in that the signals of this invention are pulses whereas those of the latter are sine waves. When compared with the neagtive impedance repeater utilized in the collective type, the repeater of this invention is just opposite to the former which is characterized by its unidirectionality and transmission of sine waves. Further when compared with the Neuristor line which is bidirectional and deals with pulse signals, the transmission cable of this invention is unidirectional. Thus this invention is different from any of the prior art repeater systems outlined hereinabove.

Accordingly it is the principal object of this invention to provide an improved repeater of simple construction and yet to provide stable action without loss.

Another object of this invention is to provide a collective type repeater wherein the wave forms of the outputs from the successive repeater stages are not required to be the same.

Another object of this invention is to provide a novel repeater which is unidirectional and operates to amplify and repeat signals having amplitudes larger than a predetermined value.

A more specific object of this invention is to provide a repeater comprising a tunnel diode which is biased to act as a resistor for signals having small amplitudes which fall in a region outside the region of negative resistance characteristic of the tunnel diode but to act as an amplifier element for signals having amplitudes included in said negative resistance characteristic region.

Yet another object of this invention is to provide a novel repeater which can amplify transmitted pulse signals with improved S/N ratio and an improved phase distortion.

Briefly stated, in accordance with this invention a plurality of two terminal network repeaters each including a tunnel diode as its principal element are shunted across a pulse transmission cable at a predetermined spacing. The tunnel diodes are biased outside the region of negative resistance characteristic so that the tunnel diode may act as a resistor with respect to signals having small amplitudes outside said negative resistance characteristic region and act as an amplifier element for signals having amplitudes that fall in said region.

While the specification concludes with claims particularly pointing out and distinctly claiming the subject matter which are regarded as the invention, it is believed that the invention will be better understood from the following description taken in connection with the accompanying drawings, in which:

FIG. 1 is a simplified diagram to explain the principle of one embodiment of this invention;

FIG. 2 is a plot of the static characteristic of a tunnel diode to explain the operation of the circuit shown in FIG. 1;

FIG. 3 shows the conductance characteristic of the tunnel diode;

FIG. 4 shows an actually measured wave form of a pulse signal transmitted over the circuit shown in FIG. 1;

Figure 7:
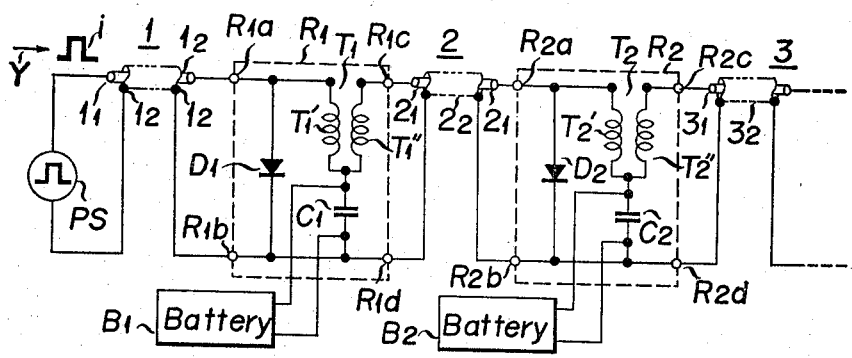
Figure 8:
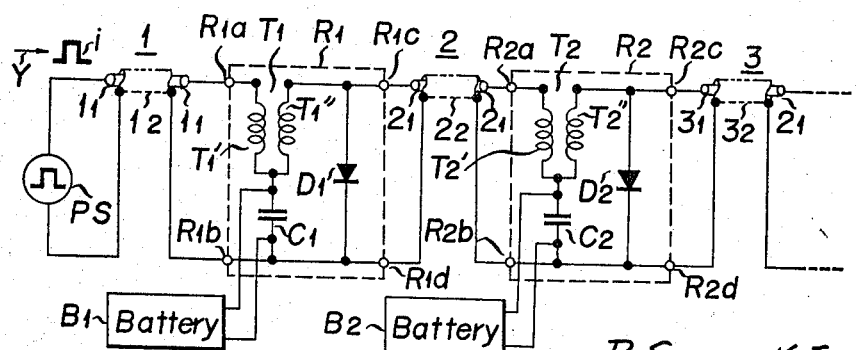
Figure 9:
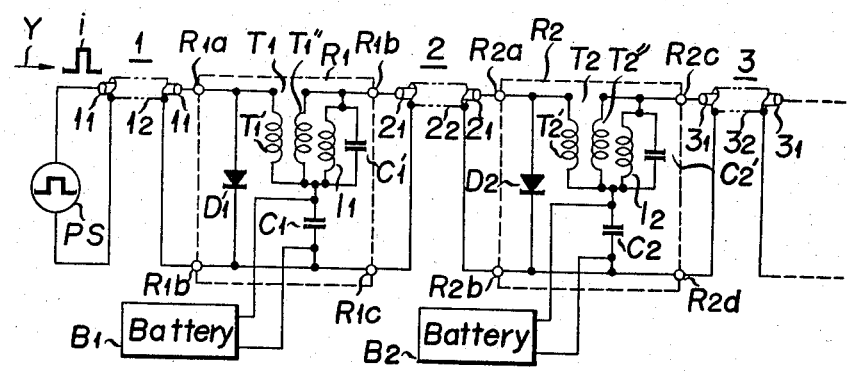
Figure 10:
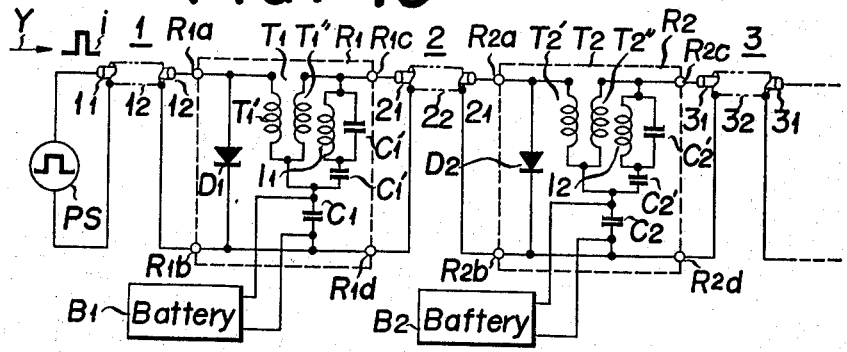
Figure 11:
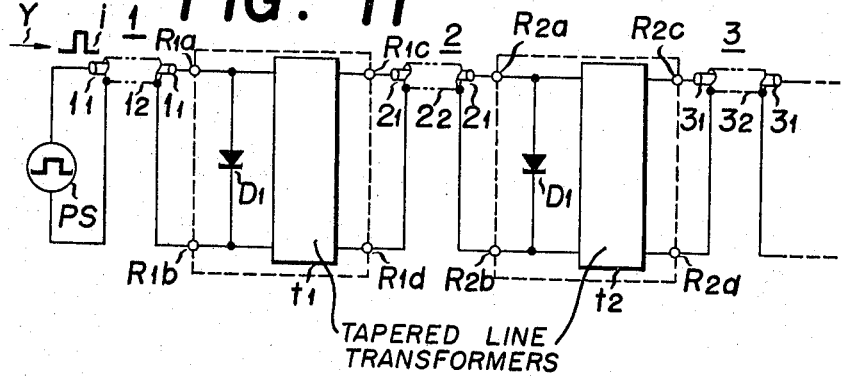
Figure 12:
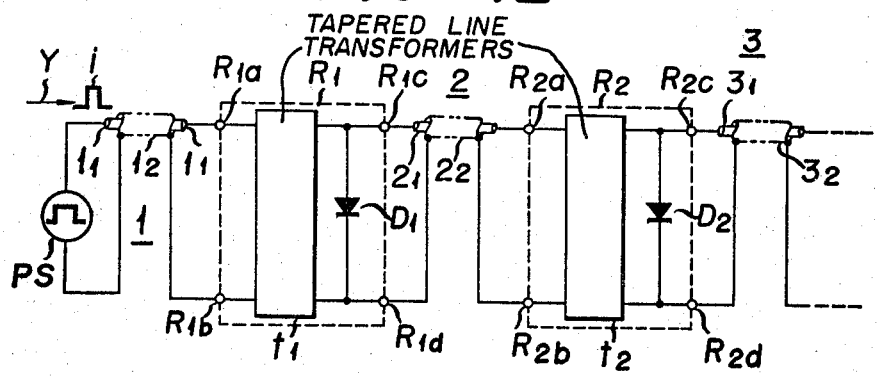
Figure 14:
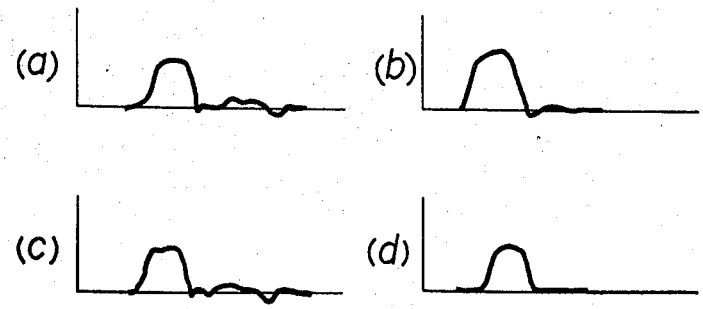
Figure 15:
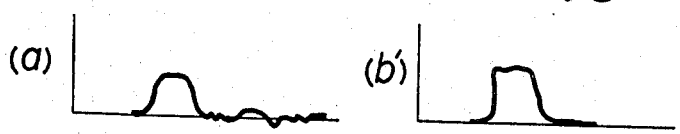
Figure 16:
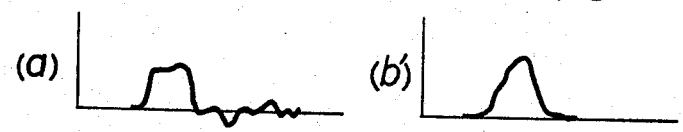
Figure 17:
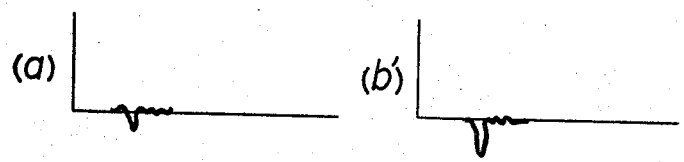
Figure 18:
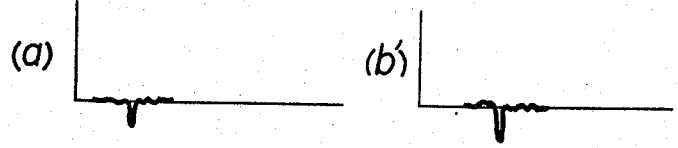

FIGS. 7 to 12 inclusive are partial detailed views of various embodiments of this invention;

FIG. 13a illustrates an input wave form of the circuit shown in FIG. 7 while FIG. 13b an output wave form;

FIGS. 14a and 14c show the input wave forms of the circuit shown in FIG. 8 whereas FIGS. 14b and 14d the output wave forms;

FIG. 15a shows the input wave form of the circuit shown in FIG. 9 while FIG. 15 the output wave form of the same circuit;

FIGS. 16a and 16b show the input and output wave forms, respectively, of the circuit shown in FIG. 10;

FIGS. 17a and 17b represent the input and output wave forms, respectively, of the circuit shown in FIG. 11; and FIGS. 18a and 18b represent the input and output wave forms, respectively, of the circuit shown in FIG. 12.

Referring now to the accompanying drawings, at first the principle of this invention will be considered by referring to FIG. 1. As shown in this figure, repeaters $R_1$ designated by a dotted line block are included at a predetermined spacing in a signal transmission line comprising cables $1_1$ and $1_2$ having circuit constants uniformly distributed along the length thereof between terminals $O_1$ and $O_3$ and $O_2$ and $O_4$. For the sake of brevity while one repeater is shown in the drawing associated with one section of the cable, it is of course to be understood that any required number of repeaters can be provided at a predetermined spacing. Input terminals $R_{1a}$ and $R_{1b}$ are connected to the left hand cables $1_1$ and $1_2$, respectively, whereas output terminals $R_{1c}$ and $R_{1d}$ are connected to the right hand cables $1_1$ and $1_2$, respectively. As schematically shown in FIG. 1 a tunnel diode $D_1$ which comprises the principal element of the repeater $R_1$ is connected between terminals $R_{1a}$, $R_{1c}$ and $R_{1b}$, $R_{1d}$.

To explain the principle of the cable shown as comprising the minimum length it is assumed that the characteristic impedances of cables $1_1$ and $1_2$ extending between terminals $O_1$ and $R_{1a}$ and $O_2$ and $R_{1b}$, respectively, are denoted by $1/G_1$ ohms and that those of cables $1_1$ and $1_2$ extending between terminals $R_{1c}$ and $O_3$ and $R_{1d}$ and $O_4$, respectively, are denoted by $1/G_2$ ohms. Further it is assumed that the conductance (or $V/i$) of the tunnel diode $D_1$ included in the repeater $R_1$ is represented by $G_E(V)$ and that the DC bias for said diode $D_1$ is set at a point $B_0$ outside the region or zone of negative resistance characteristic, as shown in FIG. 2. By the term "zone of negative resistance characteristic" as used herein is meant a zone in which said conductance $G_E(V)$ assumes negative values, said zone coinciding with a zone in which the differentiated resistances are negative when the operating bias is set in a region between a peak voltage $Vp$ and a valley voltage $Vv$ of FIG. 2. However it is to be understood that the region wherein the differentiated resistances are negative when the bias potential is set outside a zone between the peak voltage $Vp$ and the valley voltage $Vv$ according to this invention, and the zone of the negative resistance characteristic as used herein, are different. When a source of pulse signal, not shown in the drawing, is connected across terminals $O_1$ and $O_2$ of the signal transmission cables $1_1$ and $1_2$ to transmit pulse signals $i$ in the direction indicated by an arrow Y the reflection and transmission of the transmitted signals $i$ at the input terminals $R_{1a}$ and $R_{1b}$ and the output terminals $R_{1c}$ and $R_{1d}$ of the repeater $R_1$ can be represented by the following scattering matrix.

$$[S^V] = \begin{bmatrix} \dfrac{G_1 - G_2 - G_E(V)}{G_1 + G_2 + G_E(V)} & \dfrac{2G_2}{G_1 + G_2 + G_E(V)} \\ \dfrac{2G_1}{G_1 + G_2 + G_E(V)} & \dfrac{G_2 - G_1 - G_E(V)}{G_1 + G_2 + G_E(V)} \end{bmatrix} \quad (1)$$

$$[S^I] = \begin{bmatrix} \dfrac{G_1 - G_2 - G_E(V)}{G_1 + G_2 + G_E(V)} & \dfrac{2G_1}{G_1 + G_2 + G_E(V)} \\ \dfrac{2G_2}{G_1 + G_2 + G_E(V)} & \dfrac{G_2 - G_1 - G_E(V)}{G_1 + G_2 + G_E(V)} \end{bmatrix} \quad (2)$$

In order to match the transmitted signals $i$ when they are transmitted through signal transmission cable $1_1$ and $1_2$ it is necessary to satisfy the following conditions:

$$S_{11}^V = \frac{G_1 - G_2 - G_E(V)}{G_1 + G_2 + G_E(V)} = 0$$

or $$G_1 - G_2 - G_E(V) = 0 \quad (3)$$

The value of $G_E(V)$ in Equation 3 is represented by the ratio $i/V$ which can be determined by referring to FIG. 3. If it is assumed now that the bias voltage of the tunnel diode $D_1$ or the point $B_0$ in FIG. 2 is equal to 50 mv., the value of $G_E(V)$ could be determined from FIG. 3. The Equation 3 can be satisfied when it is determined that $1/G_1 = 100$ ohms and $1/G_2 = 50$ ohms. By substituting these values in Equations 1 and 2, we obtain $$S_{21}^V = 1 \quad (4)$$

$$S_{21}^V = G_2/G_1 \quad (5)$$

When, at this time, a condition of $$S_{21}^V = \frac{2G_2}{G_1 + G_2 + G_E(V)} > 1 \quad (6)$$

holds true, then the pulse signals $i$ would increase their energy when they pass through output terminals $R_{1c}$ and $R_{1d}$ of the repeater $R_1$. Since conductance $G_E(V)$ is a function of voltage the Equation 3 does not hold valid for all values of conductance $G_E V$ so that matching would not be obtained. For these conditions the DC bias voltage of the tunnel diode $D_1$ will be set at the point $B_0$ outside the region of negative resistance characteristic, as shown in FIG. 2 to modify the Equation 3 such that $$S_{11}^V = 0$$

or $$G_1 - G_2 - G_E(V) = 0 \quad (7)$$

Under this condition the conductance of the diode $D_1$ will be set at $G_E(V)$. Further by setting the characteristic impedances of transmission cables $1_1$ and $1_2$ extending between terminals $O_1$ and $R_{1a}$ and terminals $O_2$ and $R_{1b}$, respectively equal to $1/G_1$ ohms and by setting the characteristic impedances of transmission cables $1_1$ and $1_2$ extending between terminals $R_{1c}$ and $O_3$ and terminals $R_{1d}$ and $O_4$, respectively, equal to $1/G_2$ ohms so as to satisfy Equation 7, all of the transmitted signals will reflect to have opposite polarity when signals are not matched. These pulse signals of the opposite polarities will be applied across a tunnel diode contained in a repeater which is situated in a cable section ahead of the section in which the tunnel diode $D_1$ is situated as shown in FIG. 1. FIG. 4 shows an example of the measured wave form of the transmitted pulse signal under this condition. In FIG. 4 the signal denoted by a reference letter X corresponds to the wave form of a pulse signal impressed across terminals $O_1$ and $O_2$ of the cables $1_1$ and $1_2$ in FIG. 1 whereas the polarity and the configuration of the reflected signal pulse Z shows whether it is of the opposite polarity or matched with the signal pulse wave form X so as to show that the conditions of Equation 7 are satisfied.

Figure 5:
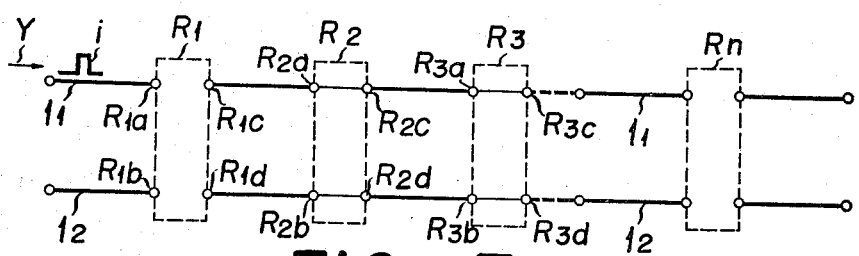
FIG. 5 is a block diagram of one embodiment of this invention.

As shown in the block diagram of FIG. 5, in order to construction the practical cable through the utilization of the smallest unit shown in FIG. 1, a plurality of repeaters $R_1, R_2 \ldots R_n$, which are the same as the above described repeater $R_1$ are positioned in the respective sections of cables $1_1$ and $1_2$. If it is assumed now that the transmitted pulse signal $i$ is applied to the $n$th repeater $R_n$ in said cable installation, then the reflected pulse signal $Z$ as shown in FIG. 4 would be applied across a tunnel diode $D_{n-1}$ contained in the $(n-1)$th repeater $R_{n-1}$ (not shown in FIG. 5) at a point $B_0C$ shown in FIG. 2. $S_{22}^V$ at this time is represented by $$S_{22}^V = \frac{G_2 - G_1 - G_E(V)}{G_1 + G_2 + G_E(V)} < 1 \qquad (8)$$

Outside the negative resistance characteristic region the diode $D_{n-1}$ will act as a resistor for the transmitted pulse signal whereby to absorb energy from the signal. As a consequence the diode is effective to maintain the system in a stable operating condition whereby the phenomena of self-oscillation may be prevented. Also it is possible to utilize the time interval during which the reflected pulse signal $Z$ is being applied across the $(n-1)$th tunnel diode to vary the transmission characteristic.

Figure 6:
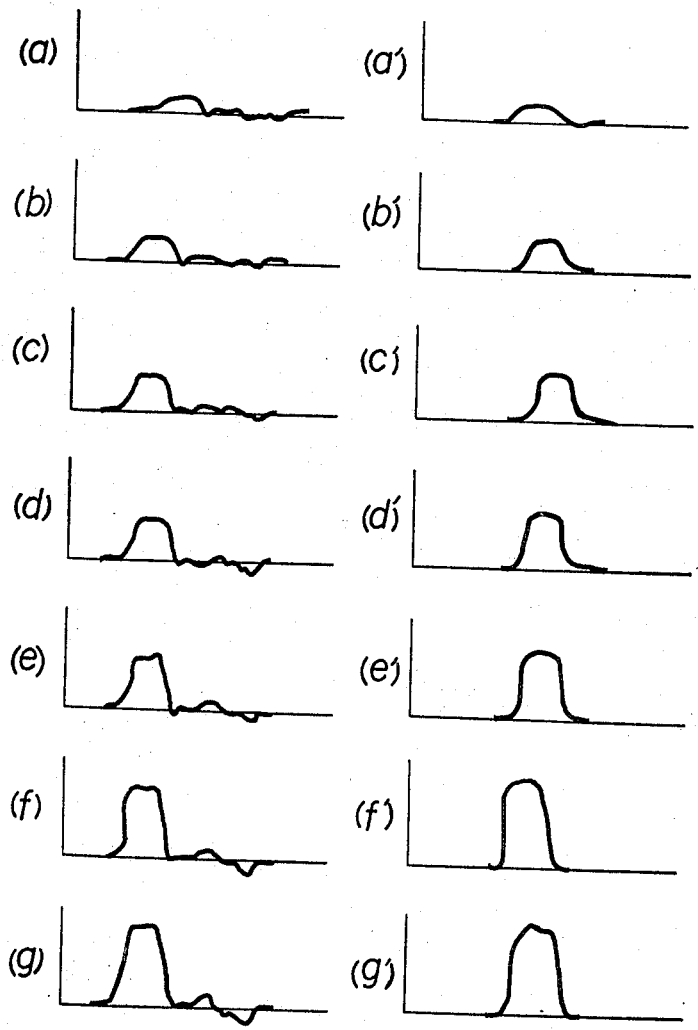
FIG. 6 shows various wave forms to aid in the understanding of the function of this invention as shown in FIG. 5.

When the transmitted pulse signal $i$ has a polarity indicated by $B_0A$ in FIG. 2 and an amplitude smaller than the peak voltage $Vp$ of the tunnel diode $D_{n-1}$, then the bias voltage $B_0$ of the tunnel diode will be outside the region of negative resistance characteristic, and since the term $S_{21}^I$ of Equation 2 and the term $S_{21}^V$ of Equation 1 will be represented by $$S_{21}^I = \frac{2G_2}{G_1 + G_2 + G_E(V)} < 1 \qquad (9)$$

$$S_{21}^V = \frac{2G_1}{G_1 + G_2 + G_E(V)} < 1 \qquad (10)$$

the signal will not be transmitted after being amplified. On the other hand when the amplitude of the transmitted pulse signal $i$ is larger than the peak voltage $Vp$ of the tunnel diode $D_{n-1}$ and falls in a region outside the voltage region wherein $G_E(V) < 0$ the tunnel diode would apparently act as a resistor just in the same manner as in the case where the amplitude is smaller than the peak voltage. However within the region of negative resistance characteristic of the tunnel diode $D_{n-1}$ the transmitted pulse signal $i$ will be amplified in a stable manner by the negative resistance characteristic of the diode and then transmitted. The transmitted pulse signal amplified in this way has greatly improved S/N ratio as well as phase distortion because the bias voltage of the tunnel diode $D_{n-1}$ is being set outside the region of negative resistance characteristic. Moreover this action is effective to compensate wave form distortion caused by the transmission cables $1_1$ and $1_2$ themselves thus greatly improving the quality of the transmitted pulse signal. FIG. 6 shows various wave forms of the transmitted pulse signal actually measured. In this figure, curves $a$ to $g$ inclusive show wave forms of the pulse signal measured on the input sides of the first to seventh repeaters $R_1$, $R_2$ . . . $R_7$ ($R_7$ not shown in FIG. 5) included in the pulse transmission cable shown in FIG. 5, whereas curves $a'$ to $g'$ inclusive show wave forms of the pulse signal as measured on the output sides of said repeaters. These curves clearly show the novel effect of this invention.

FIGS. 7 through 12 illustrate further modifications of this invention utilizing the basic concept of this invention disclosed in FIGS. 1 and 5. While in FIGS. 7 through 12 the invention is shown as applied to co-axial cables, it should be understood that this invention is not limited to this particular type of cable but can be equally embodied in any type of cable. Referring first to FIG. 7 wherein like parts are designated by the like reference characters as in FIGS. 1 and 5, a source of pulse signal PS is connected across the inner conductor $1_1$ and the outer conductor $1_2$ of a co-axial cable 1 and the opposite ends of these inner and outer conductors are respectively connected to input terminals $R_{1a}$ and $R_{1b}$ of the first repeater $R_1$. The output terminals $R_{1c}$ and $R_{1d}$ are connected to one end of the inner conductor $2_1$ and an outer conductor $2_2$, respectively, of a second co-axial cable 2. Within the repeater $R_1$, a tunnel diode $D_1$ is connected across the input terminals $R_{1a}$ and $R_{1b}$. In cascade with the diode $D_1$ is connected an impedance matching element comprising a serially connected primary winding $T_1'$ of an impedance matching transformer $T_1$ and a direct current blocking condenser $C_1$, the secondary winding $T_1''$ being connected between the junction of the primary winding $T_1'$ and the condenser $C_1$ and the output terminal $R_{1c}$ of the repeater $R_1$. By a cascade connection is meant a connection whereby the output terminals of the tunnel diode $D_1$ are connected to the input terminals of the impedance matching element. (See, for example, the definition of "cascade" in "The International Dictionary of Physics and Electronics," Van Nostrand, 1961, or in "The Random House Dictionary of the English Language," Random House, 1966.) Further a battery $B_1$ for supplying the DC bias potential to the tunnel diode is connected across the terminals of the condenser $C_1$. The battery may be disposed inside or outside the repeater $R_1$, the position of installation thereof being immaterial to this invention. The second, the third, . . . repeaters $R_1$, $R_2$ . . . are similarly connected in the second, the third, . . . cables 2, 3 . . . .

FIG. 8 illustrates a modification of FIG. 7 wherein tunnel diodes $D_1$, $D_2$, . . . contained in repeaters $R_1$, $R_2$ . . . are connected across the output terminals $R_{1c}$, $R_{1d}$; $R_{2c}$, $R_{2d}$ . . . of the repeaters instead of across the input terminals. Other components are connected in the same manner as in FIG. 7 so that their description is believed unnecessary.

FIG. 9 is different from FIGS. 7 and 8 in that a parallel resonant circuit including an inductance element $l_1$ and a tuning capacitor $C_1'$ is connected in parallel with the respective secondary windings $T_1''$, $T_2''$, . . . of the impedance transformers $T_1$, $T_2$ . . . contained in the repeaters $R_1$, $R_2$ . . . , respectively. In the arrangement shown in FIG. 10 condensers $C_0'$, $C_0''$ are respectively connected in series with the respective resonant circuits. These arrangements contribute to greatly improve the shaping function of the wave form of the transmitted pulse signal $i$. These oscillatory elements may be omitted where parasitic oscillations provided by the transformers and tunnel diodes can provide a substitute for the function thereof. In the modifications shown in FIGS. 7 through 10 the biasing battery may be used in common for all repeaters instead of providing independent batteries $B_1$, $B_2$ . . . for the respective repeaters $R_1$, $R_2$. . . . For example, a single battery connected in parallel with any one of DC blocking condensers, $C_1$, $C_2$ . . . can furnish in parallel the required biasing potential to all tunnel diodes of the system.

In still further modified arrangements shown in FIGS. 11 and 12, tapered line type transformers $t_1$, $t_2$ . . . are $T_1$, $T_2$ . . . contained in the respective repeaters $R_1$, $R_2$. . . . FIGS. 11 and 12 are different in whether the tapered line type transformers are connected across input terminals or across output terminals. The purpose of utilization of tapered line type transformers is to improve impedance matching characteristics over wide bands.

Figure 13:
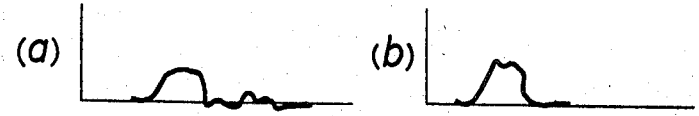

To illustrate the improved transmission characteristics exhibited by the novel cable, some data regarding the condition of transmitting pulse signals which were actually measured in cables shown in the various embodiments will be given hereunder. FIG. 13$a$ shows a wave form of a pulse signal when measured across the source of pulse signal PS. This wave was measured at a section preceding the repeater $R_1$ by a distance represented by a time delay shown in the drawing in order to clearly indicate the reflection from the repeater $R_1$ as well as the state of matching. In the following, input waves have also been measured at points by due consideration of the same factors. FIG. 13$b$ shows the wave form of a pulse when the characteristic impedances of the co-axial cables 1 and 2 shown in FIGS. 1 and 2 were respectively 50 ohms, the bias voltage applied to the tunnel diode $D_1$ was 50 mv., the impedances of the primary and secondary windings $T_1'$ and $T_1''$ of the impedance converting transformer $T_1$ were 33 ohms and 50 ohms respectively, the capacitance of the DC blocking condenser $C_1$ was 0.05 microfarads and a not shown load of 50 ohms was connected across the input terminals $R_{2a}$ and $R_{2b}$ of the second repeater $R_2$. FIG. 14a shows the wave form of a pulse appearing across terminals of the source of pulse PS shown in FIG. 8 while FIG. 14b shows the wave form of the pulse appearing across output terminals $R_{1c}$ and $R_{1d}$ of the first repeater $R_1$ when the primary and secondary windings $T_1'$ and $T_1''$ of the impedance converting transformer $T_1'$ were designed to be 50 ohms and 100 ohms respectively and other circuit components were designed to have the same values as in the case of FIG. 7. FIGS. 4c and 4d represent wave forms of the input and output corresponding to FIGS. 14a and 14b, respectively, when the bias potential of the tunnel diode $D_1$ was set to 60 mv. FIG. 15a represents the wave form of a pulse appearing across the source of pulse PS shown in FIG. 9, and FIG. 15b represents the wave form obtained across output terminals $R_{1c}$ and $R_{1d}$ of the first repeater $R_1$ when the same circuit constants shown hereinabove in connection with FIG. 7 were used and the inductance element 1 and the tuning condenser $C_1'$ were tuned to a frequency which is higher than the fundamental frequency of the transmitted pulse signal $i$. FIGS. 16a and 16b correspond to FIGS. 15a and 15b, respectively, but in this case the tuning circuit was tuned to a tuning frequency which is lower than the fundamental frequency of the transmitted pulse signal $i$.

FIG. 17 shows the wave forms of the pulse signal $i$ obtained by the circuit shown in FIG. 11. FIG. 17b represents the output wave form appearing across the output terminals of the repeater $R_1$ with the same circuit constants as in the case of FIG. 7. FIG. 18a shows the same wave form as that shown in FIG. 17a while FIG. 18b represents the wave form appearing across output terminals $R_{1c}$ and $R_{1d}$ of the repeater $R_1$ shown in FIG. 12.

As can be clearly noted from these wave forms, when the pulse signal $i$ is transmitted in the direction of the arrow Y the tunnel diode $D_1$ functions as a resistor in the region outside the region of negative resistance characteristic, in a manner described above. Accordingly pulse signals other than those transmitted, viz signals having opposite polarity or small amplitude are absorbed by the tunnel diode so that they are not transmitted. On the other hand pulse signals having sufficient large amplitudes that fall in the region of negative resistance characteristic of the tunnel diode $D_1$ and having a definite direction are amplified by the diode and then transmitted. This means that the ratio S/N is increased while at the same time the amplitudes of the output signals are amplified then the input signals, or the disclosed circuit exhibits the function of an improved repeater. As is clear from the wave forms the non-amplifying region for signals of smaller amplitudes outside the negative resistance characteristic region and the amplifying region contained in the negative resistance characteristic region shift progressively, which can be distinctly discriminated from the threshold values determined by the conventional switching phenomena. Thus it is difficult to distinctly discriminate the non-amplifying region from the amplying region, this can be explained and proven only by the voltage and current transmission characteristics.

The repeater described above eliminates the necessity of connecting from outside the repeater to a co-axial cable thus providing a revolutionary novel pulse transmission cable which permits to fabricate the repeater in the form of a disk that can be contained as a unitary structure in the co-axial cable.

Thus this invention provides a novel pulse transmission cable which is radically different from the conventional pulse transmission system and the conventional pulse repeater in that the repeater essentially consisting of a tunnel diode is operated as a two terminal network so that the diode is operated as an amplifier within the region of negative resistance characteristics but to absorb the energy of signals that fall in a region outside the negative resistance characteristic region whereby pulse signals are transmitted in only one direction.

While certain particular examples of repeaters have been disclosed in the transmission cable for the purpose of illustration and description, it is to be understood that various changes can be made therein without departing from the spirit and scope of the invention whereby it is intended to cover in the appended claims all such modification as fall within the true spirit and scope of the invention.

What is claimed is:

1. A pulse transmission cable comprising a plurality of repeaters situated along said cable at predetermined intervals, each repeater including:
   a tunnel diode shunting said cable;
   an impedance matching transformer means connected in cascade with said tunnel diode and said cable, the series circuit of a winding of said transformer means and a DC blocking capacitor being connected in parallel with said tunnel diode; and
   means for biasing said tunnel diode outside of its negative resistance range so that said tunnel diode functions as a non-amplifying element in response to pulses having an amplitude below a predetermined value and functions as an amplifying element in response to pulses having an amplitude exceeding said predetermined value.

2. A pulse transmission cable according to claim 1 wherein said biasing means supplies a DC bias potential for said tunnel diode across said DC blocking capacitor.

3. A pulse transmission cable according to claim 1 further comprising a resonant circuit connected in parallel with a winding of said impedance matching transformer means.

4. A pulse transmission cable according to claim 3 wherein said resonant circuit includes an inductance element and a tuning capacitor connected to said inductance element.

References Cited

UNITED STATES PATENTS

| | | | |
|---|---|---|---|
| 3,124,648 | 3/1964 | Miller | 178—70 |
| 3,187,266 | 6/1965 | Marshall | 178—70 |

THOMAS B. HABECKER, *Primary Examiner.*

U.S. Cl. X.R.

179—170; 307—322; 333—14, 34